(12) United States Patent
Hielscher et al.

(10) Patent No.: US 8,904,454 B2
(45) Date of Patent: Dec. 2, 2014

(54) METHOD AND ARRANGEMENT FOR STORING AND PLAYING BACK TV PROGRAMMES

(75) Inventors: Christoph Hielscher, München (DE); Stefan Jenzowsky, Gräfelfing (DE); Axel Scheuer, München (DE); Harald Schweickhardt, München (DE); Rudolf Stelzl, Dachau (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1987 days.

(21) Appl. No.: 11/887,312

(22) PCT Filed: Mar. 28, 2006

(86) PCT No.: PCT/EP2006/061079
§ 371 (c)(1),
(2), (4) Date: Jun. 24, 2009

(87) PCT Pub. No.: WO2006/103223
PCT Pub. Date: Oct. 5, 2006

(65) Prior Publication Data
US 2009/0300697 A1    Dec. 3, 2009

Related U.S. Application Data

(60) Provisional application No. 60/666,423, filed on Mar. 30, 2005.

(51) Int. Cl.
*H04N 7/173* (2011.01)
*H04N 5/76* (2006.01)
*H04N 21/2747* (2011.01)
*H04N 5/775* (2006.01)
*H04N 5/781* (2006.01)
*H04N 5/85* (2006.01)
*H04N 5/907* (2006.01)
*H04N 9/804* (2006.01)

(52) U.S. Cl.
CPC ............ *H04N 21/2747* (2013.01); *H04N 5/76* (2013.01); *H04N 5/775* (2013.01); *H04N 5/781* (2013.01); *H04N 5/85* (2013.01); *H04N 5/907* (2013.01); *H04N 9/8042* (2013.01)
USPC ................. 725/91; 725/92; 725/93; 725/103; 725/114; 725/115; 725/116; 386/292; 386/294; 386/295

(58) Field of Classification Search
None
See application file for complete search history.

(56) References Cited

U.S. PATENT DOCUMENTS 7,055,165 B2 * 5/2006 Connelly ........................ 725/9
7,389,526 B1 * 6/2008 Chang et al. .................. 725/105
(Continued)

FOREIGN PATENT DOCUMENTS

WO    WO00/04706    1/2000

OTHER PUBLICATIONS

Schiller, "Network PVR: Everything on Demand", Nov. 27, 2001, nCube; available on the internet at: http://www.ncube.com/pressroom/downloads/nvpr-whitepaper.pdf, 15 pages.

*Primary Examiner* — Mushfikh Alam
(74) *Attorney, Agent, or Firm* — Michael Haynes PLC; Michael N. Haynes

(57) ABSTRACT

The invention relates to a method and a PVR server for storing and playing back TV programs, in particular to an improved method for operating a network PVR and to an improved PVR server (102). The inventive method consists in determining the number of users storing in the personal archives thereof a determined TV program, which is stored in the memory (108) of the PVR server (102). When the user number is less than a predefined limit value, an erasing signal occurs to them and the program is cleared during a configurable period of time if no user selects said program as to be preserved.

23 Claims, 1 Drawing Sheet

(56) References Cited

U.S. PATENT DOCUMENTS

| | | | |
|---|---|---|---|
| 7,454,120 B2* | 11/2008 | Putterman et al. | 386/291 |
| 7,831,989 B1* | 11/2010 | Calzone et al. | 725/92 |
| 2003/0105809 A1* | 6/2003 | Yoshii et al. | 709/203 |
| 2003/0149988 A1* | 8/2003 | Ellis et al. | 725/87 |
| 2004/0010588 A1* | 1/2004 | Slater et al. | 709/224 |
| 2004/0240840 A1 | 12/2004 | Ledermann | |
| 2005/0002638 A1 | 1/2005 | Putterman | |
| 2006/0026665 A1* | 2/2006 | Rodriguez et al. | 725/135 |
| 2006/0143644 A1* | 6/2006 | Verhaegh et al. | 725/4 |
| 2006/0156344 A1* | 7/2006 | Iwata et al. | 725/58 |
| 2011/0019968 A1* | 1/2011 | Virden et al. | 386/230 |

* cited by examiner

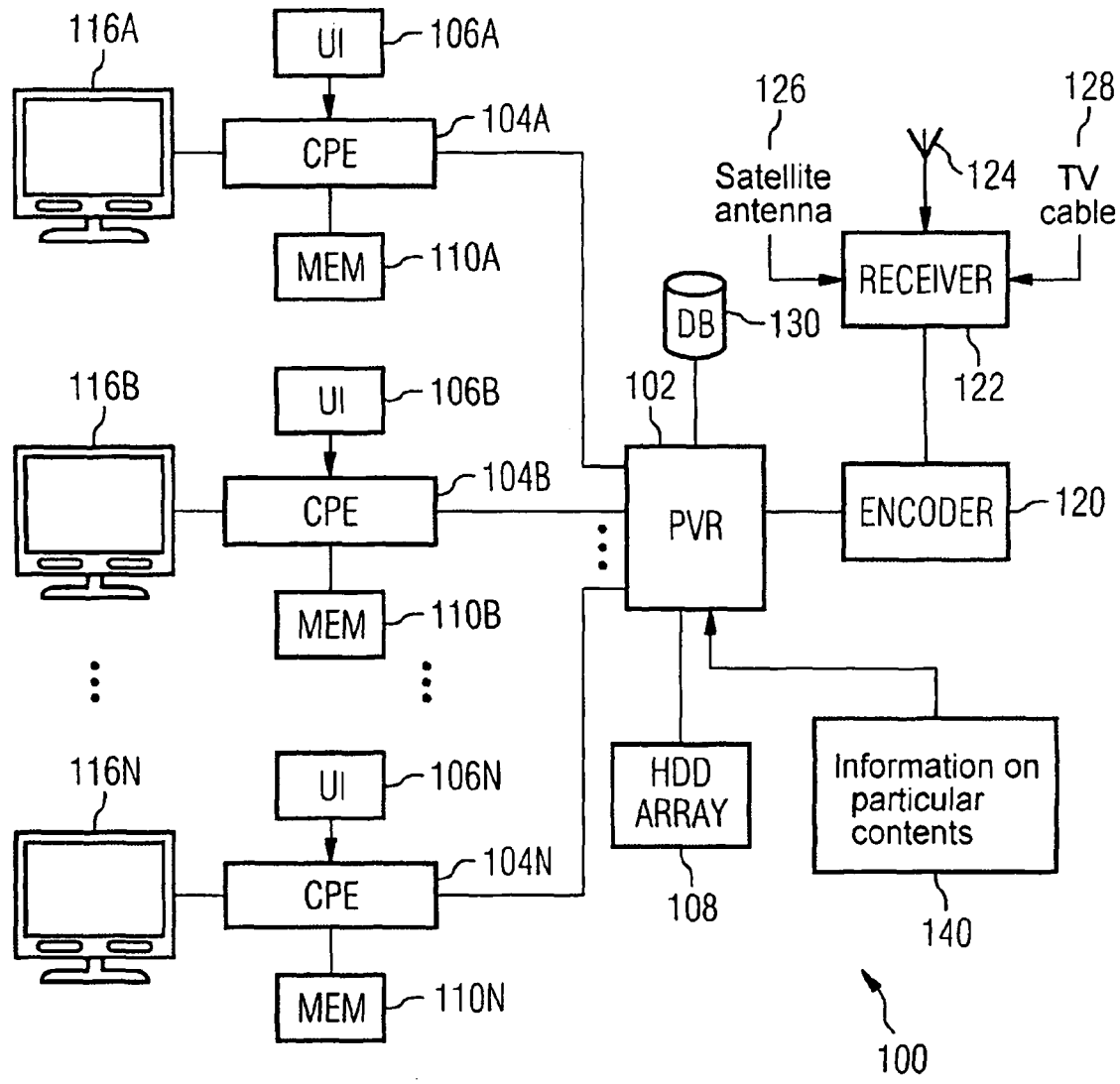

METHOD AND ARRANGEMENT FOR STORING AND PLAYING BACK TV PROGRAMMES

CROSS-REFERENCES TO RELATED APPLICATIONS

This application is a U.S. National Stage of, claims priority to, and incorporates herein by reference in its entirety, International Patent Application PCT/EP2006/061079, filed 28 Mar. 2006, which claims priority to, and incorporates herein by reference in its entirety United States Provisional Patent Application 60/666,423 filed 30 Mar. 2005.

The present invention relates to a method and a PVR server for storing and playing back TV programs. In particular the present invention provides an improved method for the operation of a network PVR and an improved PVR server.

After decades in which tape-based analog video recording devices represented the only option for home users to record and conveniently store programs broadcast over antenna, cable or satellite television, there has for some years now, since fast and at the same time low-cost video processors and powerful video codecs such as MPEG2 (1994) and MPEG4 (1998) for example have become available, been a series of mostly hard disk-based digital devices which, in addition to pure video recording, provide a series of convenient functions.

This new generation of devices is frequently referred to as personal video recorders (PVR), but is also known as digital video recorders (DVR). Whereas these modern devices can be used like classical devices for simple recording and subsequent playback of programs, their capabilities extend far beyond this. A frequently used characteristic of a PVR is for example what is known as time shifting, in which the user begins to play back a program while the recording is still in progress. Thanks to the powerful hardware of a modern PVR the image quality obtained in such cases is better than that of the conventional VHS or SVHS tape device.

Time shifting also allows the user to "pause" a program which is initially being viewed live to take a phone call for example, and to continue playback later, with it appearing to the user as if they had actually paused the live broadcast and continued it later.

In the background however the user pressing the "Pause" button has caused his PVR to record the current program and pressing the "Pause" button once again has led to the recorded program continuing to be recorded on the one hand and on the other hand to already be played back.

A very popular capability of a PVR is also that of being able to skip large sections in a recording with minimal delay. Frequently this is used during playback to skip blocks of advertisements contained in the recording. A series of services has been established around this capability which make it easier to find the boundaries of the blocks of advertisements, by for example storing the beginning and the end of a block of advertisements as points in time relative to the beginning of a program as an index for recording and thus make it possible to skip the advertisements automatically during playback.

In addition to specifically-tailored consumer electronics devices, PCs with multimedia capabilities and suitable software are increasingly being used as PVRs (known as Home Theater PC, HTPC). Technically there is hardly any difference between a specific PVR and a PCPVR; both have a large (disk) memory, sufficient processor power and suitable video codecs.

Configurable software or firmware allows both platform variants to offer the user further functions, such as searching for programs which thematically match his favorite programs. Common to both platform variants is that the recording is undertaken locally at the user and the quantity of programs able to be recorded is limited by the local disk storage. Frequently it is therefore possible to transfer recorded programs from the internal memory of the device onto recordable media such as re(writable) CD or DVD. This involves effort however, and last but not least the price of a PVR is also considerable. PVRs also suffer from the problem of parallel recording of a number of programs requiring a number of PVRs. More expensive multi-tuner devices only solve this problem to some extent since there will always be fewer tuners than TV stations and in addition the hardware of a PVR—sufficiently powerful for one channel—comes up against its limits for parallel recording of a number of channels.

To enable all the advantages of a PVR to be provided to users without them having to invest in a PVR, in the Whitepaper entitled "Network PVR: Everything on Demand", Jay Schiller, nCube Corporation, available on the Internet at http://www.ncube.com/pressroom/downloads/nvpr-white-paper.pdf a network PVR has been proposed, in which memory, encoding logic and codecs are kept by a provider in the cable network. The user receives a device with which he can select programs for recording and can retrieve stored programs, which are then transmitted to the user in real time over a broadband connection. Such a device can be far less powerful by comparison with a PVR or an HTPC. At the same time the user can rent practically unlimited storage space on the central PVR server while the operator of the PVR servers only has to keep one copy of each broadcast, which is then distributed if necessary to each user, who has stored this broadcast in their (virtual) memory.

In a development such a network PVR can be embodied so that the "programming" of the network PVR by the user is omitted and instead the user has access to all programs of his program bouquet over the 4 weeks for example.

The object of the present invention is now to specify a method and a PVR server to store and to play back TV programs which make possible an improved administration of the central storage space to be kept centrally at the operator of a network PVR.

This object is achieved by a PVR server for storing and playing back of TV programs which has the following features:

- Means for receiving a plurality of digitally-encoded TV channels;
- Means for supplying a plurality of terminals, with the terminals having means for selecting TV programs to be recorded and means for transmitting the selection to the PVR server;
- Storage means for storing TV programs to be recorded as recorded programs;
- Means for connecting to a database for storing an index which for all recorded programs indicates for which of the terminals a recorded program has been preserved in the storage means;
- Means for determining a number of terminals for which a recorded program is preserved in the storage means;
- Means for creating a delete indicator for indicating to terminals for which a recorded program is preserved in the storage means that the recorded program is only preserved for a small absolute number of terminals or if the recorded program is only preserved for a small percentage of terminals in relation to a totality of terminals for which the recorded program was selected for recording; and Means for deleting a recorded program if, within a configurable period of time the continued preservation of the recorded program has not been requested at any of the terminals, at which the delete indicator has been shown.

The invention further relates to a method for storing and playing back TV programs, with the following steps:

Receiving a plurality of digitally-encoded TV channels;
Selection by terminals of TV programs to be recorded;
Storage of TV programs to be recorded as recorded programs in storage means of a PVR server;
Storage of an index which indicates for all recorded programs the terminals for which a recorded program is preserved in the storage means;
Determining a number of terminals for which a recorded program will be preserved in the storage means;
creating a delete indicator for indicating to terminals for which a recorded program is preserved in the storage means whether the recorded program is only preserved for a small absolute number of terminals or if the recorded program is only preserved for a small percentage of terminals in relation to a totality of terminals for which the recorded program was selected for recording; and
Deleting a recorded program if, within a configurable period of time the continued preservation of the recorded program is not requested at any of the terminals, at which the delete indicator has been displayed.

In a preferred embodiment of the invention there can be provision for those terminals (104) to be removed from the index for which the further preservation of the recorded terminal has not been requested or rejected within the configurable period of time.

In a further embodiment there can be provision for the PVR server to be linked to a billing system or for a billing system to be integrated into the PVR server in order, for the further preservation of a recorded program for terminals, at which the further preservation of the recorded program was requested, to charge the users of these terminals special fees.

Advantageously the invention allows storage space occupied by a recorded program to be released, if the following conditions are fulfilled: Only a few users still have the program in their personal archive, and these users do not react to a delete indication displayed at their terminal in relation to this program within a configurable period of time (e.g. 10 days) or only react by declining. The criterion "few users" can be defined as an absolute number of network PVR users, e.g. 100 users (of for example a total of 10,000 system users), and this can be independent of now many users overall had selected the program for recording. Or a percentage of users are considered, which at the time of consideration still have a recorded program in their virtual archive, and this can be in relation to the users who originally had this program in their archive. If for example 1000 users (out of a total of 10,000 system users for example) had selected a program for recording, and 900 have already removed this program again from their virtual archive, the remaining 100 users correspond to 10% of the users who originally had this program in their archive. The two limit values can be combined.

An operator of the PVR server can configure these limit values individually or in combination so that the average storage volume of preserved programs does not exceed a specific value and can thereby obtain an optimized administration of the stored material.

Preferred exemplary embodiments of the present invention are explained below in conjunction with a drawing.

The only FIGURE shows an arrangement with a network PVR or PVR server 102 and terminals 104A . . . 104N supplied by this. The PVR server 102 receives digitally-encoded TV channels from an encoder 120. The encoder in its turn receives the TV channels from a receiver 122 which receives suitable TV signals via a terrestrial antenna 124 and/or satellite antenna 126 and/or TV cable 128. The encoder 120 and the receiver 122 can in such cases be constructed as one device. The encoder 120 uses a codec such as MPEG2 or MPEG4 or codecs derived from the former in order to first convert the TV signals present in an analog form into an efficient digital form. If a TV channel is already present as a digital data stream, for example as a Digital Video Broadcast DVB (received terrestrially as DVB-T, via cable as DVB-C or via satellite as DVB-S), the encoder 120 can forward this data stream unmodified to the PVR server 102 or modify it before forwarding, for example by adapting the bandwidth of the data stream to the bandwidth of the connection to the terminals 104.

The PVR Server 102 is linked to a mass storage device 108, for example to a hard disk array or HDD array. In technology numerous methods are known for constructing redundant mass storage arrays from hard disks, which on failure can still deliver the stored data in its entirety. The use of such redundant arrays, e.g. of a redundant array of individual disks (RAID), is of advantage in the context of the present invention, since a PVR server 102 and the connected mass storage device 108 stores all data of the TV recordings of numerous users.

The user terminals 104 are connected to the PVR server 102 for example via the TV cable network or via a DSL connection. Modern codecs allow an acceptable video quality with transmission rates from a few hundred 100 Kbit/s upwards. With the bandwidths of several Mbit/s possible technically over DSL connections two or more parallel video streams (for different playback devices in the user's household) or one individual high-quality video stream area conceivable.

The terminals 104 can be equipped with or linked to local memory 110 which for example can be embodied as a conventional hard disk and/or as flash memory and/or as RAM. Naturally special forms such as miniature hard disks available in flash memory format are also conceivable. Flash memory in this case has the advantage of allowing the data to be stored independently of the availability of a supply voltage and at the same time allowing terminals 104 to be especially quiet, since flash memory does not feature any rotating or other mechanical parts.

The memory 110 can in this case be permanently linked to the terminal 104 or can be designed to be removable. The memory 110 of the terminals 104 is subject to less stringent requirements regarding redundancy and failsafe capability than is the mass storage 108. The terminal memory 110 can be used to store user preferences and other settings provided these are not administered centrally by the PVR server 102.

The terminal or CPE 104 can be a set-top box which is connected to the picture display device 116. Alternatively the terminal 104 can be integrated into the picture display device 116. The picture display device 116 can be a conventional television. Alternatively it can be a monitor which does not itself feature a TV tuner. The terminal 104 has a user interface 106 which is used by the user for example to administer his personal virtual archive of TV programs to be recorded, if necessary his personal favorite schedule and other personal settings. This user interface can, as is normal in the field of set-top boxes, be implemented so that the user makes entries via a remote control and outputs are displayed to him via the picture display device 116.

The entries of a user relating to the recording of TV programs are sent to the PVR server 102 which creates data records from the received data, which identifies the TV-program(s) to be recorded. The corresponding TV program is provided for recording by means of a scheduler. A database, for example a user database, administers the programs intended by the user to be recorded and checks the user's authorizations, such as whether the user has subscribed to the corresponding TV channel.

If a TV program is broadcast, the PVR server 102 checks in conjunction with the database whether a user (a single user is enough) has made provision for recording this program. If this is the case, the recording is made. In this case the data arising for the recording can be stored completely in the memory 108 of the PVR server or be subdivided into a local and a central part and accordingly stored in the memory 110 of the terminal 104 or in the mass storage 108. If the program was programmed for recording at a number of terminals 104, a shared copy is provided which is stored in the memory 108 of the PVR server 102. In the database 130 addressing information is subsequently stored on the shared copy for each terminal which has provided the program for recording, such as a file name or other index information. Such a user-related entry can contain further information about the program in the form of metadata, such as the expiry date or the position of any advertising blocks. An index created in this way also allows it to be established which terminals can access a specific program, i.e. in the archive of which users a specific program can be found.

The program is played back by the user requesting by means of the user interface 106 at the terminal 104 the archive of available programs which is sent from the database 130 to the terminal 104 for display by means if the user interface, for example on the screen 116. From the archive the user can select a recording and start the playback by making the appropriate entry. The terminal sends this request to the PVR server 102, which by means of the database 130 locates the corresponding video data in the memory 108 and sends this as a video stream to the corresponding terminal 104.

When administering his archive a user can also delete programs from his archive via the user interface 106.

Such a delete process initially leads to the reference to a "deleted" program being removed in the database 130 from a data record assigned to the user, with the consequence that this program is no longer shown in the user's archive and the user thus has no further opportunity of playing back the program using his terminal 104. The actual picture data can then be deleted in the memory 108 when and only when the last user who has a program in the archive deletes this program. In all other cases the recorded program must be preserved and only the corresponding index or database entries are deleted.

Inventively there is provision for monitoring to be undertaken for each recorded program as to how many users (still) have this program in their archive. In this case a first limit value N can be defined as an absolute number of users, for example N=100 users. If fewer than N users have a specific program in their archive, a delete indication will be displayed to these users indicating that the program will be deleted from the archive unless the user explicitly requests the further preservation of the program within a specific period of time (e.g. 10 days). An operator of the network PVR can impose charges for the further preservation of the program. If at least one of the users decides on further preservation, the program continues to be preserved and after a specific period of time (e.g. four weeks) has expired, a query can again automatically be made as to whether further preservation is still required. When the query is made again a different limit value N'<N can be used as the trigger criterion. In all other cases, i.e. if at least one of the users does not explicitly opt for further preservation of the program, after the specific period of time has expired (e.g. 10 days) the program is removed from the archives of the remaining users and deleted from the memory 108 which once again makes memory available for recording programs.

As an alternative or in addition the number of users who originally made provision for recording this program can be used as a criterion for the deletion of a program and how many users from this group this program are still preserving this program in their virtual archives at the time of consideration. A second limit value can then be defined as a percentage of the users who—in relation to the number of users who original made provision for recording this program—are still preserving this program in their archive. When compared to considering an absolute number of users, this second limit value which takes into account the number of users interested in a particular program, allows a delete indication to the remaining users even if, although a large absolute number of users are still preserving the program in their archives, this number is still small by comparison with the number of users who had this program in their archive overall Conversely this second limit value also allows a differentiated control in the case of programs which only a small number of users are accessing in absolute terms (e.g. fewer than N users), since on evaluation of only the absolute number in this case the deletion indication could occur immediately after the recording. In order to prevent, when a very small number of people are interested in a program, this program still remaining on the system, since the percentage second limit value is never reached, by combination with the first limit value which is then selected to be very low it is possible to achieve the effect of the delete indication even being created when the percentage criterion is not fulfilled. In this case the first limit value can be checked for the first time when a program has already been stored in the memory 108 for a specific period of time, for example 2 weeks.

There can be provision for the monitoring of the first and/or second limit value to be undertaken immediately after recording the program for the first time and then at specific intervals thereafter, for example every 2 weeks. Alternatively provision can be made for undertaking the first monitoring of the first and/or second limit value only after a certain period of time (e.g. 2 weeks) after the recording. In a further alternative there can be provision that for a specific program the check is made each time that a user removes this program from his archive, with there being additional provision for the first limit value to basically be checked every 2 weeks for all recorded programs.

The implementation of the monitoring of the first or/and second limit value as well as the chronological sequence of the steps recording—first checking of the limit values and occasionally displaying of the delete indication—further checking with modified limit values if necessary and occasionally displaying of the delete indication to be undertaken by suitable software means, which preferably runs in programmable means of the PVR server 102 (not shown) and the terminals 104, to be able to influence the memory 108 and the database 130 in a suitable manner. The creation of such software means is possible for the person skilled in the art with reference to the present detailed description of the invention without employing their own inventive steps.

The invention claimed is:

1. A device comprising:
a personal video recording server configured to, for a TV program from a plurality of recorded TV programs, delete said TV program from a memory after a configurable amount of time and when none of a plurality of terminals, which have been provided a notification, requests continued storage of said TV program in said memory, said notification provided to said plurality of terminals responsive to a determination that a measure of said plurality of terminals is less than a configurable value.

2. The device of claim 1, wherein:
each of said plurality of recorded TV programs is selected for recording by a terminal.

3. The device of claim 1, wherein:
said TV program is selected for recording by each of said plurality of terminals.

4. The device of claim 1, wherein:
each terminal from said plurality of terminals is configured to select a desired TV program from said plurality of recorded TV programs for recording by said personal video recording server and to transmit an identification of said desired TV program to said personal video recording server.

5. The device of claim 1, wherein:
said personal video recording server is configured to connect to a database comprising an index, said index indicating that said TV program is stored for said plurality of terminals.

6. The device of claim 1, wherein:
responsive to a terminal from said plurality of terminals not requesting, within a predetermined time, continued storage of said TV program, said personal video recording server is configured to remove said terminal from an index, said index indicating that said TV program is stored for each of said plurality of terminals.

7. The device of claim 1, wherein:
responsive to a terminal from said plurality of terminals declining continued storage of said TV program, said personal video recording server is configured to remove said terminal from an index, said index indicating that said TV program is stored for each of said plurality of terminals.

8. The device of claim 1, wherein:
said personal video recording server is configured to communicatively connect to a billing system, said billing system adapted to charge a terminal that requests continued storage of said TV program.

9. The device of claim 1, wherein:
said notification is a delete indicator.

10. The device of claim 1, wherein:
said measure is a count of said plurality of terminals.

11. The device of claim 1, wherein:
said measure is a percentage of said plurality of terminals in relation to a totality of terminals.

12. The device of claim 1, wherein:
said personal video recording server is adapted to charge a terminal that requests continued storage of said TV program.

13. A method comprising:
via a personal video recording server, for a TV program from a plurality of recorded TV programs, deleting said TV program from a memory after a configurable amount of time and when none of a plurality of terminals, which have been provided a delete indicator, requests continued storage of said TV program in said memory, said delete indicator provided to said plurality of terminals responsive to a determination that a measure of said plurality of terminals is less than a configurable value.

14. The method of claim 13, wherein:
each of said plurality of recorded TV programs is selected for recording by a terminal.

15. The method of claim 13, wherein:
said TV program is selected for recording by each of said plurality of terminals.

16. The method of claim 13, wherein:
each terminal from said plurality of terminals is configured to select a desired TV program from said plurality of recorded TV programs for recording by said personal video recording server and to transmit an identification of said desired TV program to said personal video recording server.

17. The method of claim 13, wherein:
said personal video recording server is configured to connect to a database comprising an index, said index indicating that said TV program is stored for said plurality of terminals.

18. The method of claim 13, wherein:
responsive to a terminal from said plurality of terminals not requesting, within a predetermined time, continued storage of said TV program, said personal video recording server is configured to remove said terminal from an index, said index indicating that said TV program is stored for each of said plurality of terminals.

19. The method of claim 13, wherein:
responsive to a terminal from said plurality of terminals declining continued storage of said TV program, said personal video recording server is configured to remove said terminal from an index, said index indicating that said TV program is stored for each of said plurality of terminals.

20. The method of claim 13, wherein:
said personal video recording server is configured to connect to a billing system, said billing system adapted to charge a terminal that requests continued storage of said TV program.

21. The method of claim 13, wherein:
said measure is a count of said plurality of terminals.

22. The method of claim 13, wherein:
said measure is a percentage of said plurality of terminals in relation to a totality of terminals.

23. The method of claim 13, wherein:
said personal video recording server is configured to charge a terminal that requests continued storage of said TV program.

* * * * *